(12) United States Patent
You

(10) Patent No.: US 11,125,995 B2
(45) Date of Patent: Sep. 21, 2021

(54) DRIVING DEVICE FOR HEAD-UP DISPLAY

(71) Applicant: Continental Automotive GmbH, Hannover (DE)

(72) Inventor: Jaepio You, Daejeon (KR)

(73) Assignee: Continental Automotive GmbH, Hannover (DE)

( * ) Notice: Subject to any disclaimer, the term of this patent is extended or adjusted under 35 U.S.C. 154(b) by 121 days.

(21) Appl. No.: 16/617,353

(22) PCT Filed: May 17, 2018

(86) PCT No.: PCT/EP2018/062936
§ 371 (c)(1),
(2) Date: Nov. 26, 2019

(87) PCT Pub. No.: WO2018/219672
PCT Pub. Date: Dec. 6, 2018

(65) Prior Publication Data
US 2021/0132381 A1 May 6, 2021

(30) Foreign Application Priority Data
Jun. 2, 2017 (KR) .................. 10-2017-0069119

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01);
(Continued)

(58) Field of Classification Search
CPC .. G02B 7/005; G02B 7/1827; G02B 27/0101; G02B 27/01; G02B 27/0149;
(Continued)

(56) References Cited

U.S. PATENT DOCUMENTS 7,762,703 B2    7/2010  Bohme et al.
9,063,329 B2    6/2015  Jeon et al.
(Continued)

FOREIGN PATENT DOCUMENTS

CN    101464562    6/2009
CN    102047006    5/2011
(Continued)

OTHER PUBLICATIONS

Office Action dated Nov. 20, 2020 issued in European Patent Application No. 18729049.9.
(Continued)

*Primary Examiner* — William C. Dowling
(74) *Attorney, Agent, or Firm* — Cozen O'Connor

(57) ABSTRACT

A driving device for a head-up display including a motor, a driving gear mounted at the motor and rotated when the motor is driven, a worm gear engaged with the driving gear and rotated by interlocking with the driving gear, a movable mirror configured to linearly move by being engaged with the worm gear, a stopper configured to restrict movement of the movable mirror, and a bending prevention part formed in the driving gear and configured to be inserted into the worm gear, so that engagement between the driving gear and the worm gear is maintained in an excessive torque section, and noise generation is prevented.

6 Claims, 4 Drawing Sheets

(52) U.S. Cl.
CPC ............... *B60K 2370/1529* (2019.05); *G02B 2027/0154* (2013.01)

(58) Field of Classification Search
CPC ........ G02B 27/0176; G02B 2027/1529; B60K 2370/1529; B60K 35/00
See application file for complete search history.

(56) References Cited

U.S. PATENT DOCUMENTS

| | | | |
|---|---|---|---|
| 9,164,281 | B2 | 10/2015 | Hing et al. |
| 9,551,875 | B2 | 1/2017 | Ogasawara |
| 10,684,473 | B2* | 6/2020 | Chien ................ F16H 25/20 |
| 2011/0235185 | A1 | 9/2011 | Kanamori |
| 2013/0279016 | A1 | 10/2013 | Finger |
| 2014/0355093 | A1 | 12/2014 | Goepel |
| 2015/0097743 | A1 | 4/2015 | Evans |
| 2016/0048026 | A1 | 2/2016 | Ogasawara |
| 2019/0107717 | A1* | 4/2019 | Heinrich ................ B60K 37/00 |
| 2021/0041707 | A1* | 2/2021 | Misawa ............. G02B 27/0179 |

FOREIGN PATENT DOCUMENTS

| | | |
|---|---|---|
| CN | 102608761 | 7/2012 |
| CN | 103201669 | 7/2013 |
| CN | 103345042 | 10/2013 |
| CN | 103711870 | 4/2014 |
| CN | 203811900 U | 9/2014 |
| CN | 204439935 U | 7/2015 |
| CN | 105022168 | 11/2015 |
| CN | 103163646 | 6/2016 |
| CN | 106154558 | 11/2016 |
| CN | 106461151 | 2/2017 |
| CN | 106461952 | 2/2017 |
| DE | 102014118380 | 6/2016 |
| DE | 102015111618 | 1/2017 |
| EP | 0824216 | 2/1998 |
| EP | 3136155 | 3/2017 |
| JP | 2007302195 | 11/2007 |
| JP | 2010203550 | 9/2010 |
| JP | 2012-053326 | 3/2012 |
| JP | 2014-074459 | 4/2014 |
| JP | 2014163962 | 9/2014 |
| JP | 2016-008674 | 1/2016 |
| JP | 2016-080900 | 5/2016 |
| JP | 2017-068190 | 4/2017 |
| KR | 101188033 | 10/2012 |
| KR | 101396450 | 5/2014 |
| KR | 101640579 | 7/2016 |
| KR | 20160116139 | 10/2016 |
| WO | WO 2017/012999 | 1/2017 |
| WO | WO 2017077035 | 5/2017 |

OTHER PUBLICATIONS

Office Action for the corresponding Korean Patent Application No. 10-2017-0069119.
Office Action dated Mar. 1, 2021 issued in Chinese Patent Application No. 201880029750.8.
Office Action dated Mar. 3, 2021 issued in Japanese Patent Application No. 2019-565472.
Office Action dated Dec. 22, 2020 issued in Japanese Patent Application No. 2019-565472.

* cited by examiner

DRIVING DEVICE FOR HEAD-UP DISPLAY

CROSS REFERENCE TO RELATED APPLICATIONS

This is a U.S. national stage of Application No. PCT/EP2018/062936 filed May 17, 2018. Priority is claimed on Korean Application No. KR 10-2017-0069119 filed Jun. 2, 2017 the content of which is incorporated herein by reference.

BACKGROUND OF THE INVENTION

1. Field of the Invention

The present invention relates to a driving device for a head-up display, and more particularly, to a driving device for a head-up display capable of preventing noise generation caused by friction or deviation among teeth caused by driving of a motor.

2. Description of the Prior Art

Generally, a vehicle head-up display displays various pieces of vehicle information such as arrow information that is interlinked with a navigation system to guide a route change in a driver s field of view and text information indicating speed or the like in the form of augmented reality on a windshield or over the windshield, thereby preventing the scattering of the driver's line of sight.

Since, to check the above-described pieces of vehicle information, there is no need for the driver to move his or her line of sight toward a terminal providing corresponding information, and the driver can travel while viewing a frontward area at which a head-up display image is output, the driver's safety is enhanced.

The vehicle head-up display generates an image using a micro-display element, magnifies the generated image, forms the generated image into a virtual image through an optical projection system, and provides a vehicle information image to the driver.

A conventional vehicle head-up display device reflects information projected from a display element through an aspherical mirror to display the information on a windshield and rotates a motor connected to the aspherical mirror to adjust an angle of reflection or a position of the aspherical mirror so that, as a result, a height of the display of the information displayed on the windshield is adjusted.

A worm gear is used to move the aspherical mirror, and a motor and a spur gear are used for rotation of the worm gear. The spur gear may be engaged with an inside of a hub of the worm gear, and the aspherical mirror may be engaged with the worm gear and be moved horizontally.

Conventionally, when the aspherical mirror reaches a stopper due to rotation of the worm gear, there are problems in that an excessive torque load acts on an engaging portion between the worm gear and the spur gear, backlash occurs, and noise occurs due to friction or deviation among teeth. When the spur gear is rotated in the opposite direction in a state of excessive backlash, there is a problem in that, in a process in which teeth find their way back to their normal positions, noise occurs due to friction or deviation among the teeth. Therefore, there is a demand for improvement.

The background art of the present invention is disclosed in Korean Patent Publication No. 2016-0116139 (Date of Publication: Oct. 7, 2016, Title of Invention: Head Up Display Device for Vehicle and Control Method Thereof).

SUMMARY OF THE INVENTION

One aspect of the present invention is directed to providing a driving device for a head-up display capable of preventing noise generation due to friction or deviation among teeth caused by driving of a motor.

One aspect of the present invention provides a driving device for a head-up display including a motor, a driving gear mounted at the motor and rotated when the motor is driven, a worm gear engaged with the driving gear via an inside thereof and rotated by interlocking with the driving gear, a movable mirror configured to reflect an image signal and be linearly moved by being engaged with the worm gear, a stopper configured to restrict movement of the movable mirror, and a bending prevention part connected to the driving gear and configured to be inserted into the worm gear. The worm gear may include a worm gear hub in which a hub gear part engaged with the driving gear is formed, and a worm gear shaft connected to the worm gear hub and configured to move the movable mirror by being engaged with the movable mirror.

The bending prevention part may include a prevention protrusion part protruding from the driving gear, and a prevention guide part formed in the worm gear and into which the prevention protrusion part is inserted.

The bending prevention part may further include a prevention bearing mounted at the prevention protrusion part, which is rotated by coming into contact with the prevention guide part.

The bending prevention part may further include a prevention plate mounted at the worm gear and configured to prevent deviation of the prevention bearing.

In a driving device for a head-up display according to one aspect of the present invention, a bending prevention part suppresses an occurrence of the bending of a motor so that noise generation due to backlash can be prevented.

In a driving device for a head-up display according to one aspect of the present invention, a prevention protrusion part formed in a driving gear is inserted into a prevention guide part formed in a worm gear so that an occurrence of bending can be suppressed.

In a driving device for a head-up display according to one aspect of the present invention, a prevention bearing is mounted at a prevention protrusion part so that friction caused by driving of a motor can be reduced.

In a driving device for a head-up display according to one aspect of the present invention, a prevention plate is mounted at a worm gear so that deviation of a prevention bearing can be prevented.

DETAILED DESCRIPTION OF THE PRESENTLY PREFERRED EMBODIMENTS

Figure 1:
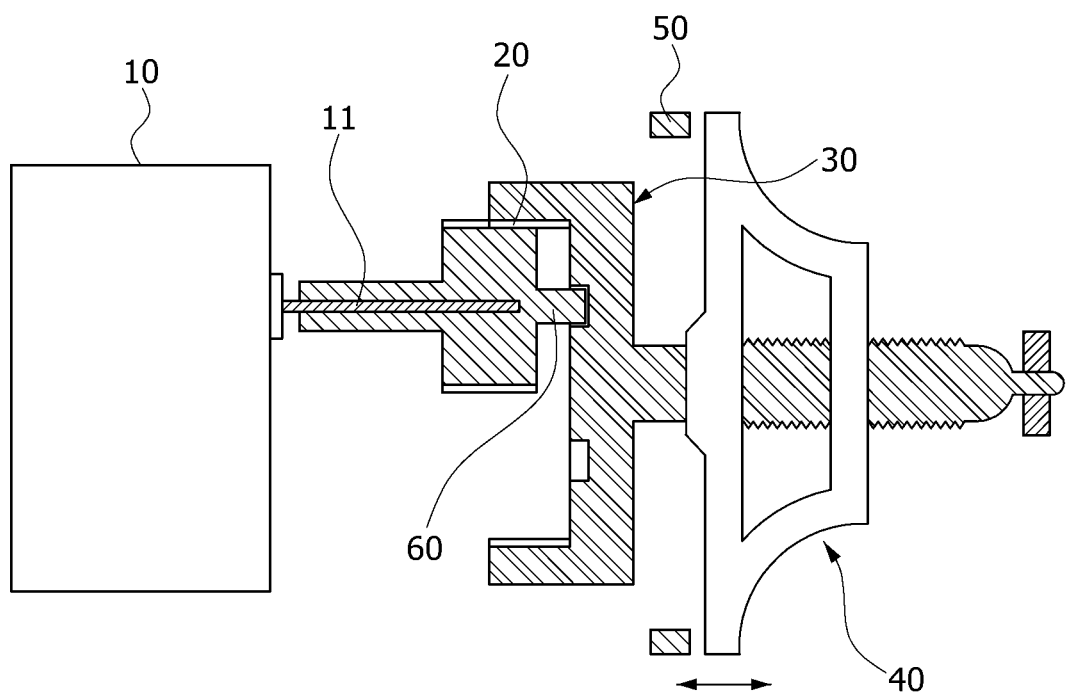
FIG. 1 is a view schematically illustrating a driving device for a head-up display.

Hereinafter, exemplary embodiments of a driving device for a head-up display according to aspects of the present invention will be described with reference to the accompanying drawings. In this process, thicknesses of lines, sizes of elements, or the like illustrated in the drawings may be exaggerated for clarity and convenience of description. The terms used below are terms defined in consideration of functions in the present invention, and thus may vary in accordance with an intention or practice of a user or an operator. Thus, such terms should be defined on the basis of content throughout the present specification.

FIG. 1 is a view schematically illustrating a driving device for a head-up display according to an embodiment of the present invention. Referring to FIG. 1, a head-up display driving device 1 according to an embodiment of the present invention includes a motor 10, a driving gear 20, a worm gear 30, a movable mirror 40, a stopper 50, and a bending prevention part 60.

The driving gear 20 is mounted at the motor 10, and when power is applied to the motor 10, the driving gear 20 is rotated. For example, the driving gear 20 may be connected to a motor shaft 11 of the motor 10 and have the shape of a spur gear. The worm gear 30 is rotated by being engaged with the driving gear 20. For example, a ring-shaped tooth arrangement may be formed inside the worm gear 30 and be engaged with the driving gear 20. Thus, the worm gear 30 may be interlocked with the driving gear 20.

The movable mirror 40 reflects an image signal and is linearly moved by being engaged with the worm gear 30, and. For example, the movable mirror 40 has a lower portion engaged with the worm gear 30 and an upper portion configured to reflect an image signal so that a position of an image shown on a windshield may be adjusted.

The stopper 50 restricts movement of the movable mirror 40. For example, the stopper 50 may be formed to include an elastic material and is fixed to a vehicle body. The stopper 50 may be disposed at each of both sides of a movement path of the linearly-moved movable mirror 40 and restrict movement of the movable mirror 40.

The bending prevention part 60 is connected to the driving gear 20 and is inserted into the worm gear 30. The bending prevention part 60 may prevent noise generation caused by bending of the driving gear 20 in a state in which an excessive torque area is formed due to the movable mirror 40 reaching the stopper 50.

Figure 2:
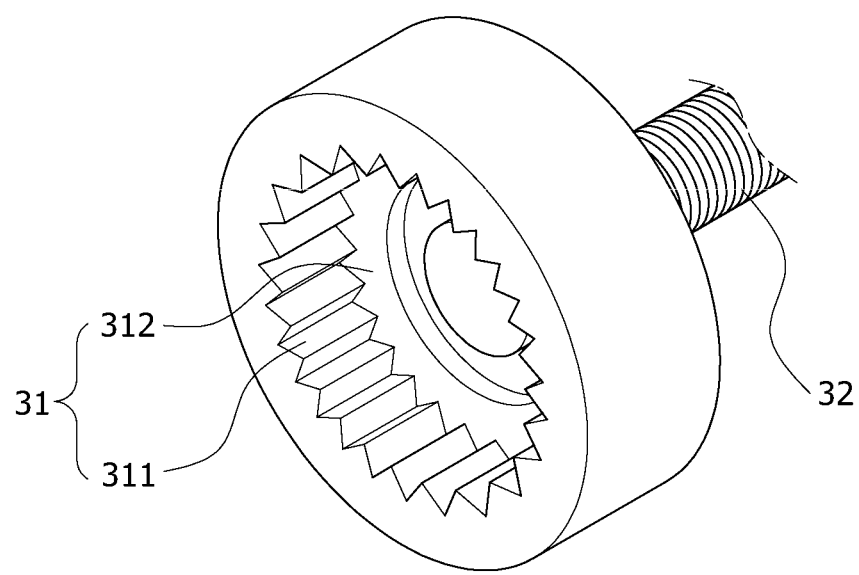
FIG. 2 is a view schematically illustrating a worm gear in a driving device for a head-up display.

FIG. 2 schematically illustrates a worm gear 30 in a driving device for a head-up display according to an embodiment of the present invention. Referring to FIGS. 1 and 2, the worm gear 30 according to an embodiment of the present invention includes a worm gear hub 31 and a worm gear shaft 32.

The worm gear hub 31 has a hub gear part 311, which is engaged with the driving gear 20, formed therein. For example, the worm gear hub 31 may have a disc shape, and a portion of one side surface of the worm gear hub 31 except for an edge thereof may be concave so that a worm gear groove part 312, which is a space into which the driving gear 20 may be inserted, is formed in the concave portion. Also, the hub gear part 311 engaged with the driving gear 20 may be formed in a circumferential direction in a wall surface corresponding to an edge of the worm gear groove part 312. The worm gear shaft 32 is connected to the worm gear hub 31, and moves the movable mirror 40 by being engaged with the movable mirror 40. For example, the worm gear shaft 32 may extend from a central portion of the other side surface of the worm gear hub 31, and reciprocate the movable mirror 40 in accordance with a change in a rotating direction.

Figure 3:
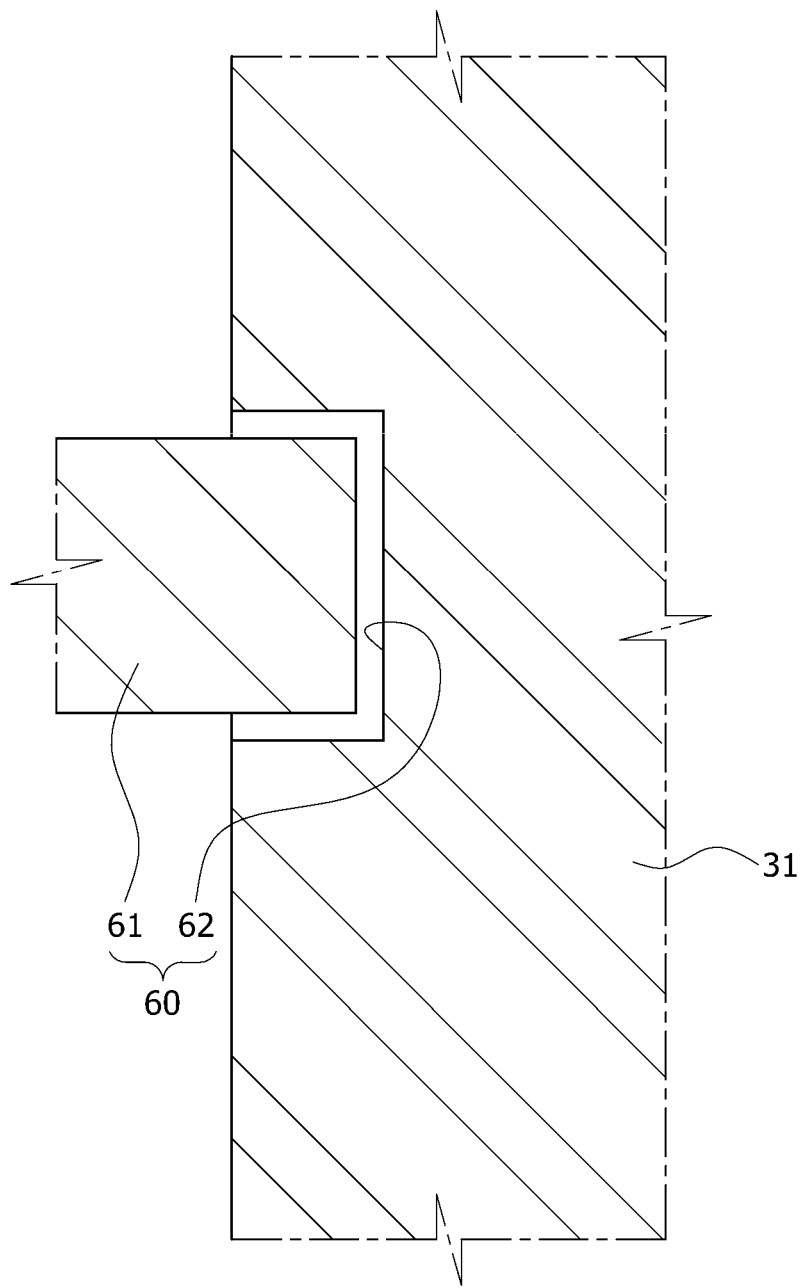
FIG. 3 is a view schematically illustrating a bending prevention part in a driving device for a head-up display.

FIG. 3 schematically illustrates a bending prevention part in a driving device for a head-up display according to an embodiment of the present invention. Referring to FIGS. 1 to 3, the bending prevention part 60 according to an embodiment of the present invention includes a prevention protrusion part 61 and a prevention guide part 62.

The prevention protrusion part 61 protrudes from the driving gear 20. For example, the prevention protrusion part 61 may protrude from a central portion of the driving gear 20. The prevention protrusion part 61 is assembled to the driving gear 20 for replacement of the prevention protrusion part 61 when damage occurs.

The prevention guide part 62 is formed in the worm gear 30, and forms a space into which the prevention protrusion part 61 is inserted. For example, the prevention guide part 62 may form a groove in the worm gear groove part 312 in the circumferential direction.

Figure 4:
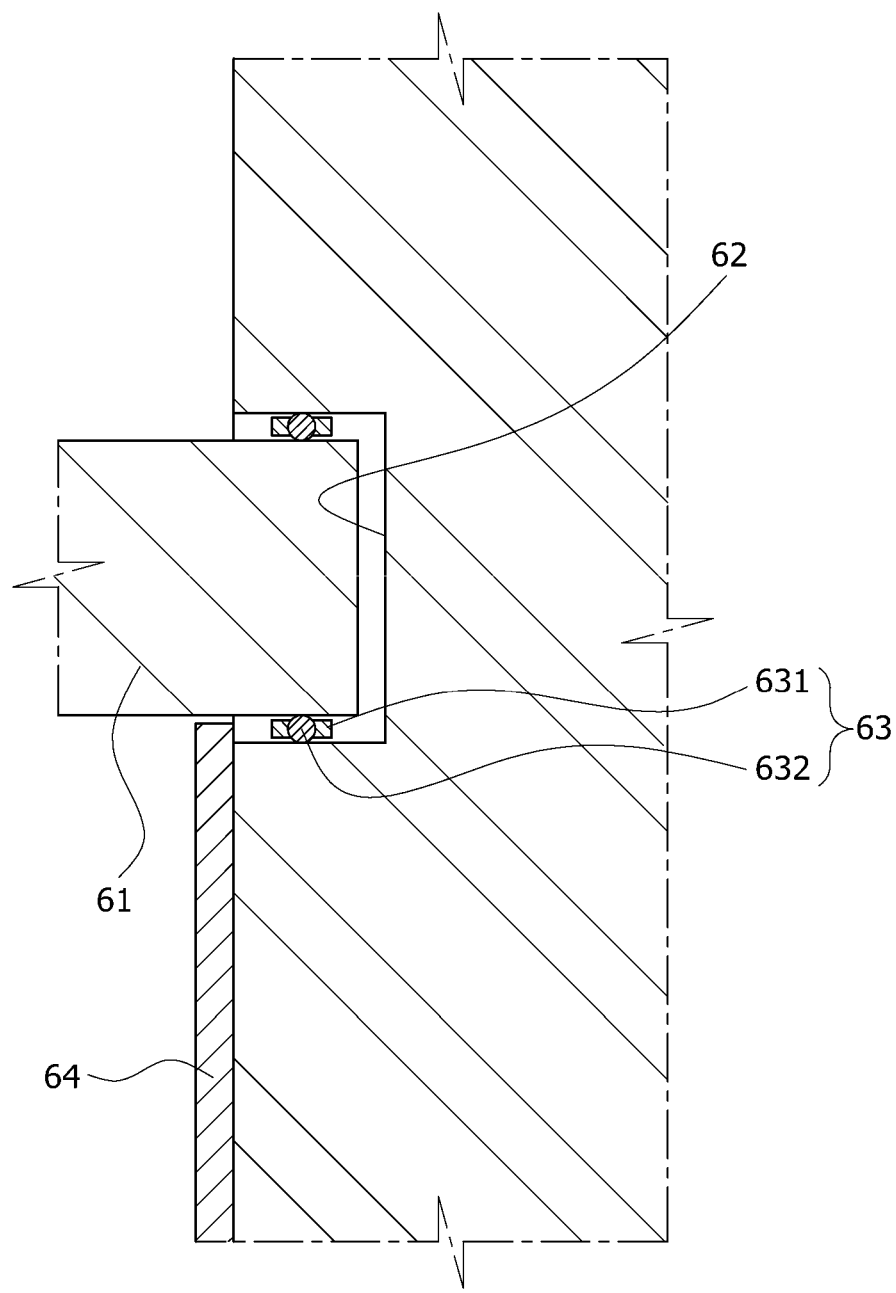
FIG. 4 is a view schematically illustrating a state in which a prevention bearing and a prevention plate have been added to FIG. 3.

FIG. 4 schematically illustrates a state in which a prevention bearing and a prevention plate have been added to FIG. 3. Referring to FIGS. 3 and 4, the bending prevention part 60 according to an embodiment of the present invention may further include a prevention bearing 63.

The prevention bearing 63 is mounted at the prevention protrusion part 61 and is rotated by coming into contact with the prevention guide part 62. For example, the prevention bearing 63 may include a bearing main body part 631 and a bearing ball part 632. The bearing main body part 631 may have a ring shape and surround the prevention protrusion part 61. The bearing main body part 631 may be disposed between the prevention protrusion part 61 and the prevention guide part 62. The bearing ball part 632 may be rotatably mounted at the bearing main body part 631 and protrude toward the outside of the bearing main body part 631. The bearing ball part 632 may come into contact with the prevention protrusion part 61 and the prevention guide part 62 and reduce frictional resistance in an operation process.

The bending prevention part 60 according to an embodiment of the present invention may further include a prevention plate 64. The prevention plate 64 is mounted at the worm gear 30 and prevents deviation of the prevention bearing 63. For example, the prevention plate 64 may have a disc shape and be assembled to a central portion of the worm gear groove part 312. An outer diameter of the prevention plate 64 may correspond to a distance from the central portion of the worm gear groove part 312 to the prevention bearing 63 so that an edge portion of the prevention plate 64 may prevent the prevention bearing 63 from being withdrawn from the prevention guide part 62.

The operation of the driving device for a head-up display according to an embodiment of the present invention having the above-described structure will be described below.

The driving gear 20 is mounted at the motor shaft 11 formed in the motor 10, and the driving gear 20 is inserted into the worm gear groove part 312 formed in the worm gear hub 31. In this case, the driving gear 20 is engaged with the hub gear part 311, and the prevention protrusion part 61 is inserted into the prevention guide part 62 formed in the worm gear groove part 312.

In the above-described state, when the motor 10 is driven, the driving gear 20 is rotated in one direction, and the worm gear hub 31 becomes interlocked therewith. Then, the movable mirror 40 engaged with the worm gear shaft 32 formed in the worm gear hub 31 is moved in one direction and reflects an image signal.

When the movable mirror 40 reaches the stopper 50 due to driving of the motor 10, movement of the movable mirror 40 is restricted even when the motor 10 is driven. Thus, a state of excessive torque may occur between the driving gear 20 and the worm gear hub 31 and cause the motor shaft 11 to be bent.

However, by the prevention protrusion part 61 being inserted into the prevention guide part 62, bending of the motor shaft 11 may be prevented even when the state of excessive torque occurs between the driving gear 20 and the worm gear hub 31. Thus, an engaged state between the driving gear 20 and the worm gear hub 31 may be maintained, backlash may be prevented, and noise generation may be prevented.

In this case, by the prevention bearing 63 being mounted at the prevention protrusion part 61, friction caused by direct contact between the prevention protrusion part 61 and the prevention guide part 62 may be prevented when the worm gear hub 31 is rotated due to driving of the motor 10. By the prevention plate 64 being mounted on the worm gear hub 31, deviation of the prevention bearing 63 may be prevented.

In the head-up display driving device 1 according to an embodiment of the present invention, the bending prevention part 60 suppresses an occurrence of bending of the motor 10 so that noise generation caused by backlash can be prevented.

In the head-up display driving device 1 according to an embodiment of the present invention, the prevention protrusion part 61 formed in the driving gear 20 is inserted into the prevention guide part 62 formed in the worm gear 30 so that an occurrence of bending can be suppressed.

In the head-up display driving device 1 according to an embodiment of the present invention, the prevention bearing 63 is mounted at the prevention protrusion part 61 so that friction caused by driving of the motor 10 can be reduced.

In the head-up display driving device 1 according to an embodiment of the present invention, the prevention plate 64 is mounted at the worm gear 30 so that deviation of the prevention bearing 63 can be prevented.

Although the present invention has been described with reference to the embodiments illustrated in the drawings, the embodiments are merely illustrative, and one of ordinary skill in the art to which the present invention pertains should understand that various modifications and other equivalent embodiments are possible from the above-described embodiments. Therefore, the actual technical scope of the present invention should be defined by the claims below.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A driving device for a head-up display, comprising:
   a motor;
   a driving gear mounted at the motor and configured to be rotated when the motor is driven;
   a worm gear engaged with the driving gear via a radially inner surface of the worm gear and configured to be rotated by interlocking with the driving gear;
   a movable mirror configured to reflect an image signal and linearly moved by being engaged with the worm gear;
   a stopper configured to restrict movement of the movable mirror; and
   a bending prevention part connected to the driving gear and configured to be inserted into the worm gear.

2. The driving device of claim 1, wherein the worm gear comprises:
   a worm gear hub in which a hub gear part is formed and configured to be engaged with the driving gear by the radially inner surface; and
   a worm gear shaft connected to the worm gear hub and configured to move the movable mirror by being engaged with the movable mirror.

3. The driving device of claim 2, wherein the bending prevention part comprises:
   a prevention protrusion part protruding axially from the driving gear; and
   a prevention guide part formed in the worm gear and into which the prevention protrusion part is axially inserted.

4. The driving device of claim 3, wherein the bending prevention part further comprises:
   a prevention bearing mounted at the prevention protrusion part and configured to be rotated by coming into contact with the prevention guide part.

5. The driving device of claim 4, wherein the bending prevention part further comprises:
   a prevention plate mounted at the worm gear and configured to prevent deviation of the prevention bearing from the prevention guide part.

6. The driving device of claim 3, wherein the prevention guide part is configured as a groove in the worm gear hub.

* * * * *